US012192094B2

(12) United States Patent
Branch

(10) Patent No.: US 12,192,094 B2
(45) Date of Patent: *Jan. 7, 2025

(54) METHOD AND APPARATUS OF AUTOMATIC ROUTE OPTIMIZATION IN A PRIVATE VIRTUAL NETWORK FOR CLIENT DEVICES OF A LOCAL NETWORK

(71) Applicant: CLOUDFLARE, INC., San Francisco, CA (US)

(72) Inventor: Christopher Philip Branch, Romford (GB)

(73) Assignee: CLOUDFARE, INC., San Francisco, CA (US)

(*) Notice: Subject to any disclaimer, the term of this patent is extended or adjusted under 35 U.S.C. 154(b) by 264 days.

This patent is subject to a terminal disclaimer.

(21) Appl. No.: 17/509,904

(22) Filed: Oct. 25, 2021

(65) Prior Publication Data

US 2022/0045934 A1 Feb. 10, 2022

Related U.S. Application Data

(63) Continuation of application No. 16/387,431, filed on Apr. 17, 2019, now Pat. No. 11,159,420.

(51) Int. Cl.
*H04L 45/12* (2022.01)
*H04L 9/40* (2022.01)
(Continued)

(52) U.S. Cl.
CPC .......... *H04L 45/124* (2013.01); *H04L 45/02* (2013.01); *H04L 45/123* (2013.01); *H04L 45/74* (2013.01); *H04L 63/0272* (2013.01); *H04L 63/08* (2013.01)

(58) Field of Classification Search
CPC ....... H04L 45/74; H04L 45/02; H04L 45/124; H04L 63/08; H04L 63/0272; H04L 45/123
See application file for complete search history.

(56) References Cited

U.S. PATENT DOCUMENTS 6,567,405 B1 * 5/2003 Borella ............... H04L 61/2575
370/389
7,376,087 B2 5/2008 Srikrishna
(Continued)

FOREIGN PATENT DOCUMENTS

WO WO-2014172854 A1 * 10/2014 ............. H04L 47/12
WO WO-2015002342 A1 * 1/2015 ............. H04B 3/36
(Continued)

OTHER PUBLICATIONS

Final Office Action, U.S. Appl. No. 16/387,431, filed Apr. 29, 2021, 19 pages.
(Continued)

Primary Examiner — Mehmood B. Khan
(74) Attorney, Agent, or Firm — NICHOLSON DE VOS WEBSTER & ELLIOTT LLP

(57) ABSTRACT

A client device establishes a first VPN connection with a VPN server. Traffic is sent from the client device through the first VPN connection that is destined to a different client device that has a second VPN connection with the VPN server. The client device receives a public network address of the different client device and routing metrics from the VPN server. Based at least in part on the routing metrics, the client device determines an optimal route to the different client device, where the optimal route is a connection between the client device and the different client device that does not traverse the VPN server. The client device establishes a VPN connection with the different client device and transmits traffic to that different client device using the VPN connection using the public network address of the different client device.

21 Claims, 9 Drawing Sheets

(51) Int. Cl.
*H04L 45/02* (2022.01)
*H04L 45/74* (2022.01)

(56) References Cited

U.S. PATENT DOCUMENTS

| | | | |
|---|---|---|---|
| 9,319,445 B2* | 4/2016 | Garmark | H04N 21/47202 |
| 10,181,906 B1* | 1/2019 | Harel | H04B 10/25753 |
| 10,397,061 B1 | 8/2019 | Chawla et al. | |
| 10,601,779 B1 | 3/2020 | Matthews et al. | |
| 2002/0075844 A1* | 6/2002 | Hagen | H04L 63/0442 |
| | | | 370/328 |
| 2003/0046390 A1* | 3/2003 | Ball | H04L 41/12 |
| | | | 709/224 |
| 2003/0106067 A1* | 6/2003 | Hoskins | H04L 69/167 |
| | | | 725/111 |
| 2003/0212772 A1* | 11/2003 | Harris | H04L 61/00 |
| | | | 709/245 |
| 2004/0168062 A1 | 8/2004 | Isozaki et al. | |
| 2004/0174887 A1* | 9/2004 | Lee | H04L 12/4645 |
| | | | 370/395.53 |
| 2005/0228894 A1 | 10/2005 | Takabayashi et al. | |
| 2006/0293028 A1 | 12/2006 | Gadamsetty et al. | |
| 2007/0127461 A1* | 6/2007 | Yamada | H04L 45/54 |
| | | | 370/389 |
| 2007/0299954 A1 | 12/2007 | Fatula | |
| 2008/0034416 A1* | 2/2008 | Kumar | H04L 12/4641 |
| | | | 726/15 |
| 2008/0259938 A1* | 10/2008 | Keene | H04L 45/00 |
| | | | 370/400 |
| 2010/0131960 A1* | 5/2010 | Suganthi | H04L 67/1008 |
| | | | 718/105 |
| 2010/0165881 A1 | 7/2010 | Hof et al. | |
| 2010/0228879 A1 | 9/2010 | Wiget et al. | |
| 2011/0219131 A1 | 9/2011 | Allen et al. | |
| 2012/0096540 A1 | 4/2012 | Hilgenkamp | |
| 2013/0031244 A1 | 1/2013 | Zhang et al. | |
| 2013/0182712 A1 | 7/2013 | Aguayo et al. | |
| 2014/0115114 A1* | 4/2014 | Garmark | H04N 21/8456 |
| | | | 709/219 |
| 2015/0043350 A1 | 2/2015 | Basilier | |
| 2015/0172109 A1 | 6/2015 | Alhandy | |
| 2015/0249644 A1 | 9/2015 | Xu | |
| 2016/0006837 A1 | 1/2016 | Reynolds et al. | |
| 2016/0073327 A1* | 3/2016 | Clougherty | H04L 12/4633 |
| | | | 370/254 |
| 2016/0277277 A1 | 9/2016 | Chan et al. | |
| 2016/0373356 A1 | 12/2016 | Xu et al. | |
| 2017/0134254 A1 | 5/2017 | Mueller | |
| 2017/0142198 A1 | 5/2017 | Alhandy | |
| 2017/0279717 A1 | 9/2017 | Bethers et al. | |
| 2018/0103085 A1 | 4/2018 | Fang et al. | |
| 2018/0255145 A1 | 9/2018 | Wang | |
| 2018/0343192 A1 | 11/2018 | Antonyraj et al. | |
| 2019/0052630 A1 | 2/2019 | Lapidous et al. | |
| 2019/0068250 A1* | 2/2019 | Kim | H04W 52/40 |
| 2019/0253382 A1* | 8/2019 | Ramaraj | H04L 67/51 |
| 2019/0312836 A1 | 10/2019 | Phillips | |
| 2019/0312933 A1 | 10/2019 | Richards et al. | |
| 2020/0154272 A1 | 5/2020 | Uy et al. | |
| 2020/0162431 A1* | 5/2020 | Goldschlag | H04L 9/3218 |
| 2020/0177550 A1 | 6/2020 | Valluri et al. | |
| 2023/0164077 A1* | 5/2023 | Branch | H04L 45/745 |
| | | | 370/392 |

FOREIGN PATENT DOCUMENTS

| | | | | |
|---|---|---|---|---|
| WO | WO-2016048370 A1 * | 3/2016 | | G01S 5/021 |
| WO | WO-2017179286 A1 * | 10/2017 | | H04W 4/04 |
| WO | WO-2018086696 A1 * | 5/2018 | | H04B 17/318 |

OTHER PUBLICATIONS

Networks and Tunnel Routing, Cloud VPN, Google Cloud, Nov. 6, 2018, 9 pages, downloaded at https://cloud.google.com/vpn/docs/concepts-networks-routing on Jan. 22, 2019.
Non-Final Office Action, U.S. Appl. No. 16/387,431, Nov. 13, 2020, 16 pages.
Notice of Allowance, U.S. Appl. No. 16/387,431, Sep. 15, 2021, 10 pages.
Virtual Private Network, Wikipedia, Jan. 15, 2019, 9 pages, downloaded at hllps://en.wikipedia.org/wiki/Virtual_private-network on Jan. 22, 2019.

* cited by examiner

```
┌─────────────────────────────────────────────────────────────────────┐
│  DETERMINE, BASED ON THE SECOND PUBLIC NETWORK ADDRESS OF THE       │
│  SECOND CLIENT DEVICE, AN OPTIMAL ROUTE FROM THE FIRST CLIENT       │
│  DEVICE TO THE SECOND CLIENT DEVICE FOR THE TRAFFIC IN THE VPN      │
│                              514                                     │
│  ┌───────────────────────────────────────────────────────────────┐  │
│  │ DETERMINE A ROUTE IN THE LOCAL NETWORK FOR A THIRD VPN        │  │
│  │ CONNECTION FOR TRANSMITTING TRAFFIC BETWEEN THE FIRST CLIENT  │  │
│  │ DEVICE AND THE SECOND CLIENT DEVICE WHERE THE THIRD VPN       │  │
│  │ CONNECTION AVOIDS THE VPN SERVER                              │  │
│  │                           602                                  │  │
│  └───────────────────────────────────────────────────────────────┘  │
└─────────────────────────────────────────────────────────────────────┘
                                 │
                                 ▼
┌─────────────────────────────────────────────────────────────────────┐
│   ESTABLISH A THIRD VPN BETWEEN THE FIRST CLIENT DEVICE AND THE     │
│                         SECOND CLIENT DEVICE                         │
│                              604                                     │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│    OBTAIN THE SECOND VPN CREDENTIALS OF THE SECOND CLIENT DEVICE    │
│  │                         605A                                  │  │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│    TRANSMIT THE FIRST VPN CREDENTIALS OF THE FIRST CLIENT DEVICE    │
│  │                         605B                                  │  │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────────┘
                                 │
                                 ▼
┌─────────────────────────────────────────────────────────────────────┐
│  TRANSMIT THE VPN TRAFFIC TO THE SECOND CLIENT DEVICE THROUGH THE   │
│                       THIRD VPN CONNECTION                           │
│                              606                                     │
└─────────────────────────────────────────────────────────────────────┘
                                 │
                                 ▼
┌─────────────────────────────────────────────────────────────────────┐
│   RECEIVE THE TRAFFIC FROM THE SECOND CLIENT DEVICE THROUGH THE     │
│                       THIRD VPN CONNECTION                           │
│                              608                                     │
└─────────────────────────────────────────────────────────────────────┘
```

FIGURE 6

METHOD AND APPARATUS OF AUTOMATIC ROUTE OPTIMIZATION IN A PRIVATE VIRTUAL NETWORK FOR CLIENT DEVICES OF A LOCAL NETWORK

CROSS-REFERENCE TO RELATED APPLICATIONS

This application is a continuation of U.S. application Ser. No. 16/387,431, filed Apr. 17, 2019, which is hereby incorporated by reference.

FIELD

Embodiments of the invention relate to the field of network services; and more specifically to automatic route optimization in a private virtual network for client devices of a local network.

BACKGROUND

A Virtual Private Network (VPN) is an internet security service that allows users to access the Internet as though they were connected to a private network. A VPN service allows a user to encrypt Internet communications and provide the user with a strong degree of anonymity when browsing the Internet. Users may use a VPN service to protect themselves against eavesdropping that may occur on public Wi-Fi, to circumvent Internet censorship, or to connect to a business's internal network for the purpose of remote work.

Establishing a VPN tunnel between two network nodes involves establishing and maintaining a logical network connection (the logical network connection can be referred to as a VPN connection). The VPN connection between two network nodes may contain intermediate hops. In the VPN connection, packets constructed in a given VPN protocol format are encapsulated within another carrier protocol. The VPN packets are then transmitted between VPN client and server and de-encapsulated on the receiving end.

For Internet-based VPNs, packets in a VPN protocol are encapsulated within Internet Protocol (IP) packets. VPN protocols also support authentication and encryption to keep the tunnels secure. Thus, a VPN is a network tunneled within another network (e.g., within the IP network).

VPN clients within a VPN normally communicate via one or more intermediary network devices that know the topology of the VPN. The VPN clients can be referred to as peer VPN nodes and the intermediary network devices can be referred to as VPN servers. Typically, VPN clients know the VPN address of other peer VPN nodes and may communicate with one another though the VPN server using their respective VPN addresses.

BRIEF DESCRIPTION OF THE DRAWINGS

The invention may best be understood by referring to the following description and accompanying drawings that are used to illustrate embodiments of the invention. In the drawings:

FIG. 6 illustrates a flow diagram of exemplary operations performed in a client device for optimal VPN route determination, in accordance with some embodiments.

DESCRIPTION OF EMBODIMENTS

Figure 1:
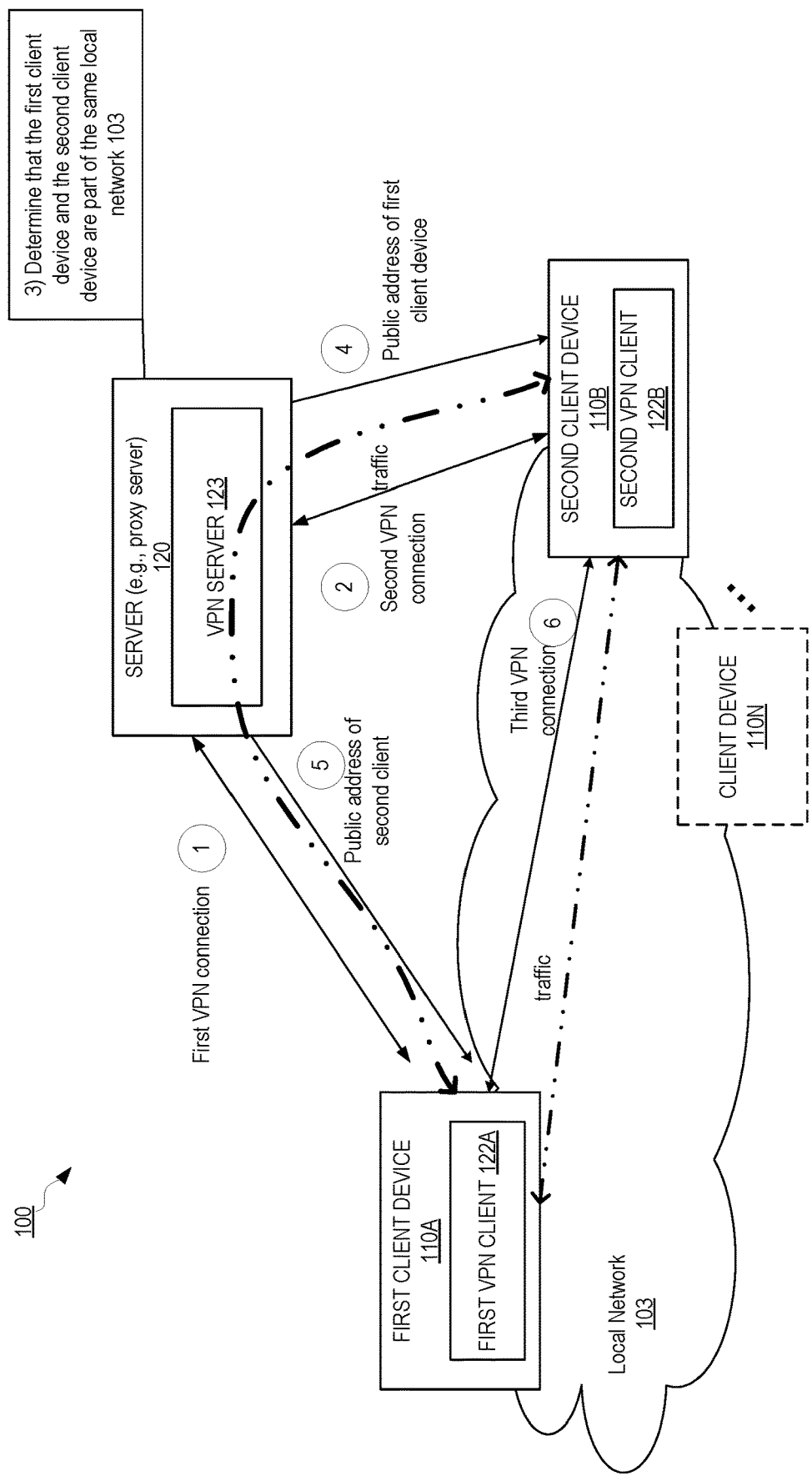
FIG. 1 illustrates a block diagram of an exemplary system for enabling automatic route optimization in virtual private networks, in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

VPN clients within a VPN typically communicate via one or more intermediary network devices that know the topology of the VPN. The VPN clients can be referred to as peer VPN nodes and the intermediary network devices can be referred to as VPN servers. Typically, VPN clients know the VPN address of other peer VPN nodes and may communicate with one another through the VPN server using their respective VPN addresses.

However, it may be advantageous to VPN clients to communicate directly in the VPN without going through a VPN server. For example, two VPN clients can be located within the same local network and a direct communication within the local network can be faster and more efficient than going through the VPN server.

Some mechanisms exist for enabling network devices to discover one another on a local network and to establish a direct communication through the carrier protocol. However, these mechanisms do not enable the nodes to establish a direct VPN connection without going through the VPN server. Therefore, the connection between the peers may not have the advantages offered by VPNs. Split tunneling is another mechanism that can be used to enable communication between the peer nodes in the local network and VPN connection from the peer nodes towards the VPN server. However, implementing split tunneling at each one of the VPN clients is burdensome, complex, and may be unreliable.

The embodiments of the present invention can be used by users that need to securely communicate through a VPN without the burden of operating a VPN server. The embodiments of the present invention allow users to benefit from the advantages of a VPN while avoiding unnecessary communication with a VPN server for traffic that can be forwarded between locally-connected network devices. The embodiments described herein further enable users to avoid the implementations of difficult/unreliable split-tunneling mechanisms. The embodiments of the present invention further ensure that local traffic remains encrypted between the network devices.

The embodiments presented herein describe a mechanism for enabling two VPN clients of a same local network to route data to each other using an alternative path in the VPN other than the path through the VPN server. The alternative path can be determined based on metrics that allow for optimization of traffic between the two VPN clients while avoiding sending the traffic to the VPN server.

In one embodiment, a method and a VPN server for automatic route optimization in a private virtual network for client devices of a local network are described. The VPN server establishes a first VPN connection with a first client device. The VPN server is remote from the first client device. The VPN server further establishes a second VPN connection with a second client device. The VPN server is remote from the second client device. The VPN server receives, through the first VPN connection, traffic from the first client device that is destined to the second client device and transmits the traffic to the second client device through the second VPN connection. The VPN server determines that the first client device and the second client device are part of a same local network; and responsive to determining that the first client device and the second client device are part of the same local network, performs the following operations of transmitting, to the first client device and through the first VPN connection, a second public network address of the second client device, and transmitting, to the second client device and through the second VPN connection, a first public network address of the first client device. The transmission of the first public network address and the second public network address causes the first client device to determine an optimal route from the first client device to the second client device for the traffic in the VPN.

FIG. 1 illustrates a block diagram of an exemplary network for optimizing traffic in a virtual private network, in accordance with one embodiment. The architecture 100 includes a server 120, and two or more client devices 110A-B ... 110N. While in some embodiments, the local network 103 may include only two client devices (e.g., 110A-B), in other embodiments, the local network 103 includes more than two client devices.

Each one of the client devices 110A-N is a computing device (e.g., laptop, workstation, smartphone, palm top, mobile phone, tablets, gaming system, set-top box, etc.) that is capable of accessing network resources (e.g., they include software such as client network applications (e.g., web browsers, mobile applications, etc.) that are capable of accessing network resources). In some embodiments, the client network applications are implemented based on web application program interfaces (APIs) enabling the client device to request access to resources served by a server. Each one of the client devices 110A-N includes a respective VPN client (e.g., VPN client 122A and VPN client 122B). The VPN client is operative to perform operations of a private virtual network protocol. Several VPN protocols can be used without departing from the scope of the present invention. Each one of the client devices 110A-B is operative to establish a VPN connection with the server 120. Each one of the client devices 110A-B is operative to transmit and receive traffic to and from a server through a VPN connection based on VPN credentials associated with the respective client device. The VPN credentials identify a VPN address of the client device and cryptographic credentials to allow for secure communication through the associated VPN connection. In some embodiments, the first client device 110A is operative to transmit a request for a network resource that is served by the client device 110B. In some embodiments, the first client device 110A is operative to transmit the request for the network resource through the VPN connection(s). The VPN connection can be referred to as a VPN tunnel.

The first client device 110A and the second client device 110B are part of a same local network 103. The local network 103 is a computer network that interconnects electronic devices within a limited area (such as a residence, office, university, a hospital, a laboratory, a factory, etc.). The local network 103 may include two or more electronic devices that are coupled. Several network technologies can be used to enable the electronic devices to communicate (e.g., Ethernet and Wi-Fi can be used to allow communication between the electronic devices within the local network 103). Further, each one of the first client device 110A and the second client device 110B are located remotely from the server 120. The first client device 110A and the second client device 110B can be connected to the server 120 through a wide area network (WAN). The WAN (e.g., Internet) typically covers a larger geographic distance than the local network.

The server 120 is a computing device coupled with one or more client devices through a network (not illustrated). The server 120 includes a VPN server 123. The VPN server 123A is operative to perform operations of a private virtual network protocol. Several VPN protocols can be used without departing from the scope of the present embodiments. The server 120 is operative to establish one or more VPN connections with one or more client devices. The server 120 is operative to establish a first VPN connection (operation 1) with the first client device 110A and a second VPN connection (operation 2) with the second client device 110B. The server 120 is operative to transmit and receive traffic to and from a client device (e.g., client device 110A or client device 110B) through a VPN connection based on VPN credentials. The VPN credentials include a VPN address of the respective client device as well as cryptographic credentials of the client device. The VPN credentials further include a VPN address associated with the server and cryptographic credentials associated with the server. The cryptographic credentials of the server and the client device allow for secure communication through the VPN connection. The cryptographic credentials can include authentication credentials that allow for authentication of the server and the client device. The cryptographic credentials may further include encryption keys for encrypting traffic within the respective VPN tunnel (first VPN tunnel and second VPN tunnel) between the client device and the server.

In some embodiments, the server 120 enables client devices to access network resources hosted on origin servers through a VPN connection. For example, the second client device 110B may be an origin server. The server 120 is not part of the local network of the origin servers. The server 120 is outside of the local area network of the origin server and is typically not physically accessible by the owner/administrator of the origin server. In some embodiments, the server 120 is a proxy server that is part of a cloud-based proxy service. The cloud-based proxy server provides different services for customers. For example, the server 120 can be a first proxy server situated between client devices (e.g., client device 110A) and an origin server (e.g., client device 110B). In one embodiment, the proxy server 120 is a reverse proxy server. Certain network traffic is received and processed through the proxy servers. For example, web traffic (e.g., HTTP requests/responses, HTTPS requests/responses, SPDY requests/responses, etc.) for domains of the origin server may be received and processed at the server 120. In one embodiment, the domain owner of the resources served by the origin server is a customer of the cloud-based proxy service. The owner of the server 120 is typically different than the owner of the origin server.

By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment, the cloud-based proxy service provides a mechanism for establishing VPN connections between client devices and proxy servers of the service when the client devices attempt to access resources served by the origin servers.

The architecture 100 may further include a DNS system that is not illustrated. The DNS system may include multiple DNS servers to resolve DNS requests. The DNS system includes an authoritative name server, which is an authoritative name server for the service. Thus, the authoritative name server is the authoritative name server for the domains corresponding to the origin servers. Accordingly, when the DNS system resolves a request for a domain corresponding to the origin server, the authoritative name server provides the authoritative answer. It should be understood that the DNS system may include several DNS servers (e.g., preferred domain servers, top-level domain name servers, other domain servers). It should also be understood that there may be multiple authoritative web servers for the service and they may be geographically distributed. When the domain owner is a customer of the cloud-based proxy service, DNS resolution requests for the domain owned by a domain owner that is a customer of the service resolve to an IP address of a proxy server that is part of the service (e.g., the server 120). When the domain owner is not a customer of the cloud-based proxy service, or alternatively the server 120 is not part of a cloud-based proxy service, DNS resolution requests for the domain owned by the domain owner resolve to an IP address of the origin server.

In some embodiments the cloud-proxy service has multiple proxy servers that are geographically distributed. For example, in some embodiments, the service uses multiple point of presences (POPs). A POP is a collection of networking equipments (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

In operation, the server 120 establishes (at operation 1) a first VPN connection with the first client device 110A. The server 120 establishes (operation 2) a second VPN connection with the second client device 110B. The server 120 receives through the first VPN connection, traffic from the first client device that is destined to the second client device. The VPN server 123 processes the traffic received through the first VPN connection and determines that the traffic is to be transmitted to the second client device through the second VPN connection (2) to the second client device 110B. The server 120 transmits the traffic to the second client device through the second VPN connection. At operation 3, the server 120 determines that the first client device 110A and the second client device 110B are part of a same local network (e.g., local network 103).

In response to determining that the first client device 110A and the second client device 110B are part of the same local network 103, the server 120 performs operations 4 and 5. At operation 4, the server 120 transmits, to the first client device 110A and through the first VPN connection, a second public network address of the second client device. At operation 5, the server 120 transmits, to the second client device 110B and through the second VPN connection, a first public network address of the first client device 110A. The transmission of the first public network address and the second public network address causes the first client device 110A to determine an optimal route from the first client device 110A to the second client device 110B for the traffic in the VPN. For example, the first client device 110A and the second client device 110B may establish a third VPN connection (operation 6) to transmit the traffic directly within the local network 103 without going through the server 120. In another example, the client devices may determine that the optimal route can remain the route through the VPN server 123 and the third VPN connection is not established.

Figure 2A:
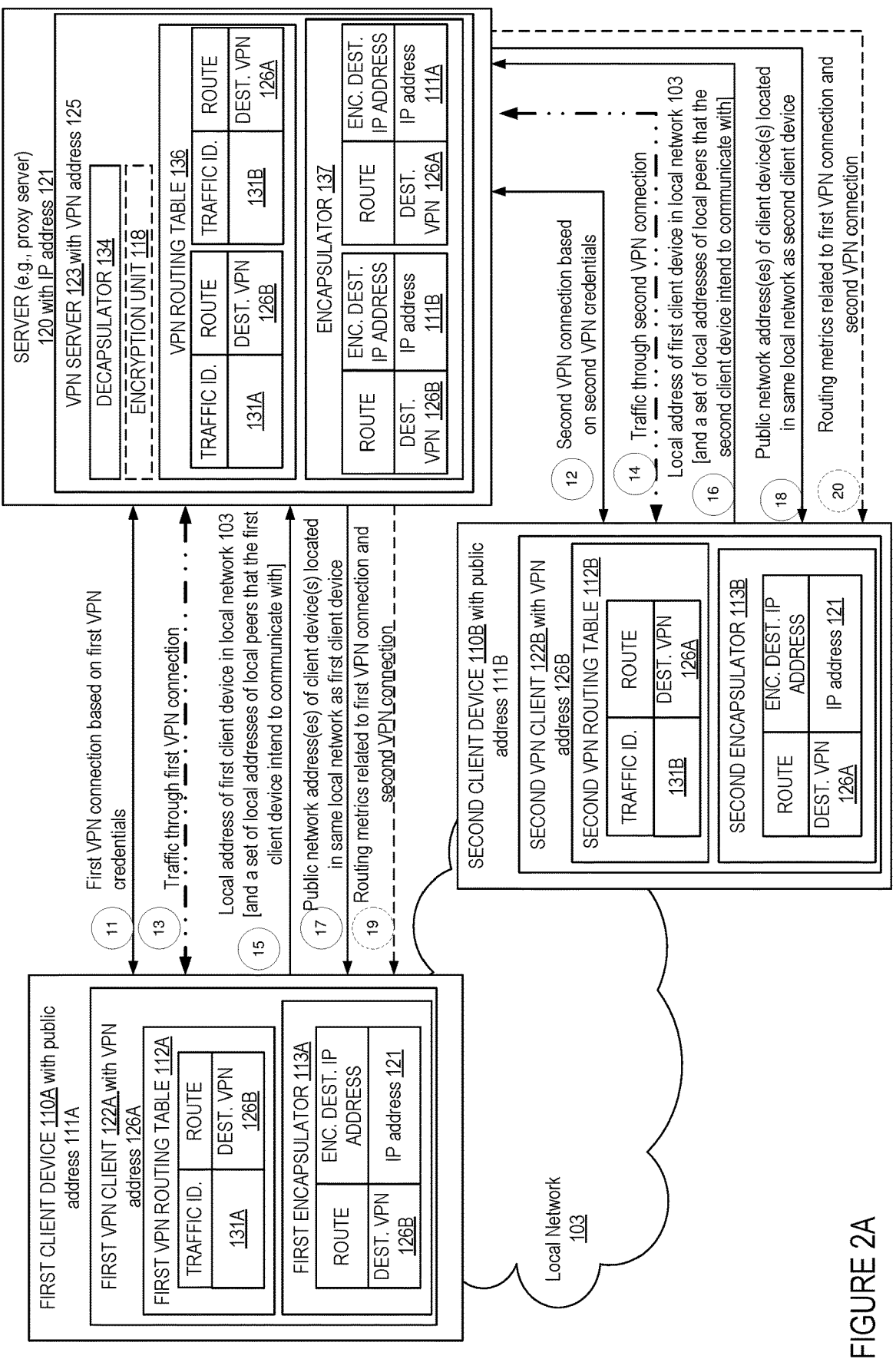
FIG. 2A illustrates a block diagram of detailed view of an exemplary system for enabling automatic route optimization in virtual private networks, in accordance with some embodiments.

FIG. 2A illustrates a block diagram of detailed view of an exemplary system for enabling automatic route optimization in virtual private networks, in accordance with some embodiments. Each one of the devices (e.g., client device 110A, client device 110B, and server 120) is a network device that has an associated public network address: IP address (e.g., IP address 111A, IP address 111B, and IP address 121). The IP address of each one of the devices 110A, 110B, and 120, enables the device to communicate through the IP protocol with the other devices in the network. The IP address is an Internet-addressable address (i.e., a public network address that allows communication between devices through a network such as the Internet). Each one of the devices 110A, 110B and 120 may be coupled to another one of the devices 110A-B, 120 via one or more network devices that are not illustrated. Each one of the first client device 110A and the second client device 110B may also be associated with local network addresses. While being located in the same local network, the first client device 110A and the second client device 110B may not have access to the public IP address of the other client device. Further each one of the first client device 110A, the second client device 110B and the server 120 are associated with respective VPN addresses (e.g., VPN address 126A, 126B, and 125).

To enable the VPN communication each one of the client devices 110A-B and the server 120 includes a respective VPN routing table 112A-B and 136. Each one of the VPN routing tables 112A-B and 136 includes VPN entries that define VPN routes in the network. Each VPN route has a traffic identifier (traffic ID) and a corresponding VPN destination address (VPN Dest. Add.). In some embodiments, the VPN route further includes an identification of the source VPN address. The traffic identifier uniquely identifies the traffic that is to be transmitted through the first VPN connection identified by the VPN route 126B. Each one of the client devices 110A and 110B, and the VPN server 123 further includes a respective encapsulator 113A, 113B, and 137 that includes for each VPN route a respective IP encapsulation destination address. The IP encapsulation destination address identifies the IP address that is to be used as a destination for encapsulating the VPN traffic addressed to a particular VPN destination address.

In an initial set up the first client device 110A is configured to include an entry in the VPN routing table 112A to forward traffic with traffic ID 131A through the first VPN route identified with Dest. VPN address 126B. Further the first encapsulator 113A includes an entry indicating that for VPN destination 126B the associated encapsulation IP address is IP address 121 of the server 120. In this initial set up, the routing table 112A is configured such that traffic identified based on traffic ID 131A is routed through the first VPN connection between the first client device 110A and the server 120. While the destination of the traffic is VPN dest. Address 126B (the VPN address of the second client device), the traffic is first transmitted through the first VPN connection (encapsulated with IP packets destined to the IP address of the server 120).

In an initial set up the second client device 110B is configured to include an entry in the VPN routing table 112B to forward traffic with traffic ID 131B through the second VPN route identified with Dest. VPN address 126A. In some embodiments, the traffic ID 131B is different from the traffic ID 131A. In other embodiments, the traffic ID 131B is the same as the traffic ID 131A. While in some embodiments, the traffic sent from the first client device to the second client device can be the same as the one transmitted from the second client device to the first client device, in other embodiments, the traffic transmitted from the first client device 110A towards the second client device can be different from the traffic send from the second client device 110B to the first client device 110A. Further, in the initial set up, the second encapsulator 113B includes an entry indicating that for VPN destination 126A the associated encapsulation IP address is IP address 121 of the server 120. In this initial set up the routing table 112B is configured such that traffic identified based on traffic ID 131B is routed through the second VPN connection between the second client device and the server 120. While the destination of the traffic is VPN dest. Address 126A (the VPN address of the first client device), the traffic is first transmitted through the second VPN connection (encapsulated with IP packets destined to the IP address of the server 120).

In the initial set up the VPN server is configured to include a first entry in the VPN routing table 136 to forward traffic with traffic ID 131B through the second VPN route identified with Dest. VPN address 126A and a second entry in the VPN routing table 136 to forward traffic with traffic ID 131A through the first VPN route identified with Dest. VPN address 126B. In some embodiments, the traffic ID 131B is different from the traffic ID 131A. In other embodiments, the traffic ID 131B is the same as the traffic ID 131A. Further, in the initial set up, the encapsulator 137 includes an entry indicating that for VPN destination 126A the associated encapsulation IP address is IP address 111A of the first client device 110A and further includes another entry indicating that for VPN destination 126B the associated encapsulation IP address is IP address 111B. In this initial set up the routing table 136 is configured such that traffic identified based on traffic ID 131B is routed through the first VPN connection between the first client device and the server 120 and traffic identified based on traffic ID 131A is routed through the second VPN connection established between the second client device and the server 120.

The first VPN connection is established, at operation 11, based on the entry in the VPN routing table 112A with the VPN destination address 126B and the IP address 121 of the server 120. The traffic 13 transmitted through the VPN connection is encapsulated within IP packets with destination IP address 121. The first VPN connection is established based on the cryptographic credentials associated with the first client device 110A and the server 120. The cryptographic credentials associated with the first client device 110A and the server 120 enable a secure communication through a VPN protocol between the first client device 110A and the server 120. In some embodiments, the cryptographic credentials include cryptographic keys of the first client device 110A and the server 120 that are exchanged during the establishment of the first VPN connection. The server 120 may include the encryption unit 118 that is used to encrypt the traffic to be transmitted in the first VPN connection and the second VPN connection. Each one of the first client device 110A and the second client device 110B may also include respective encryption units (not illustrated) that are used for encrypting the traffic for transmission through the first or the second VPN connections.

The first client device 110A sends, at operation 15, the local address that identifies the first client device 110A in the local network 103. Additionally or alternatively, the first client device 110A transmits to the server 120, a set of local addresses of local peers that the first client device intend to communicate with through VPN. For example, the first client device may transmit a local address of the second client device 110B to the server 120 as part of the set of one or more devices located in the local network 103. In these embodiments, the first client device 110A can be either configured to include local addresses of the other devices that are located in the same local network or it can be configured to obtain through a network discovery mechanism the local addresses of other client devices located in the same local network 103. In some embodiments, the first client device 110A can transmit only its own local address and does not transmit any other local addresses of other devices located in the local network 103. In other embodiments, the first client device 110A can transmit only local addresses of peer client devices located in the same local network 103 and does not transmit its own local address. In a third embodiment, the first client devices 110A may transmit both its local address and local addresses of the peer client devices to the server 120.

The second VPN connection is established, at operation 12, based on the entry in the VPN routing table 112B with the VPN destination address 126A and the IP address 121 of the server 120. The traffic 14 transmitted through the VPN connection is encapsulated within IP packets with destination IP address 121. The second VPN connection is established based on the cryptographic credentials associated with the second client device 110B and the server 120. The cryptographic credentials associated with the second client device 110B and the server 120 enable a secure communication through a VPN protocol between the second client device 110B and the server 120. In some embodiments, the cryptographic credentials include cryptographic keys of the second client device 110B and the server 120 that are exchanged during the establishment of the second VPN connection.

The second client device 110B sends, at operation 16, the local address that identifies the second client device 110B in the local network 103. Additionally or alternatively, the second client device 110B transmits to the server 120, a set of local addresses of local peers that the second client device intend to communicate with through VPN. For example, the second client device may transmit a local address of the first client device 110A to the server 120 as part of the set of one or more devices located in the local network 103. In these embodiments, the second client device 110B can be either configured to include local addresses of the other devices that are located in the same local network or it can be configured to obtain through a network discovery mechanism the local addresses of other client devices located in the same local network 103. In some embodiments, the second client device 110B can transmit only its own local address and does not transmit any other local addresses of other devices located in the local network 103. In other embodiments, the second client device 110B can transmit only local addresses of peer client devices located in the same local network 103 and does not transmit its own local address. In a third embodiment, the second client devices 110B may transmit both its local address and local addresses of the peer client devices to the server 120.

In response to determining that the first client device 110A and the second client device 110B are part of the same local network 103, the server 120 performs operations 17 and 18. At operation 17, the server 120 transmits, to the first client device 110A and through the first VPN connection, a public network address of the second client device, and transmits, at operation 18, to the second client device 110B and through the second VPN connection, a public network address of the first client device 110A. In some embodiments, the server 120 further transmits the VPN credentials of the first client device 110A to the second client device 110B and the VPN credentials of the second client device 110B to the first client device 110A. In other embodiments, the server 120 does not transmit the VPN credentials of the first client device 110A nor the VPN credentials of the second client device 110B and these credentials can be obtained by each one of the first client device 110A and the second client device 110B at a later stage during establishment of a third VPN connection between the first client device 110A and the second client device 110B.

In some embodiments, the server 120 may further perform operations 19 and 20. At operation 19, the server 120 transmits to the first client device 110A routing metrics related to first VPN connection and the second VPN connection. At operation 20, the server 120 transmits to the second client device 110B routing metrics related to first VPN connection and the second VPN connection. The routing metrics can contain one or more metrics that can be used by each one of the client devices 110A and 110B to determine the best route among multiple routes to a destination. A routing metric can be determined based on information like path length, bandwidth, load, hop count, path cost, delay, maximum transmission unit (MTU), reliability and communications cost. These metrics are measured and determined by the server 120 for each one of the first VPN connection and the second connection and can be transmitted to each one of the client devices 110A-B. In other embodiments, the server 120 does not transmit any routing metric to the client devices and the determination of the best route is then performed based on metrics determined by the client devices themselves.

Figure 2B:
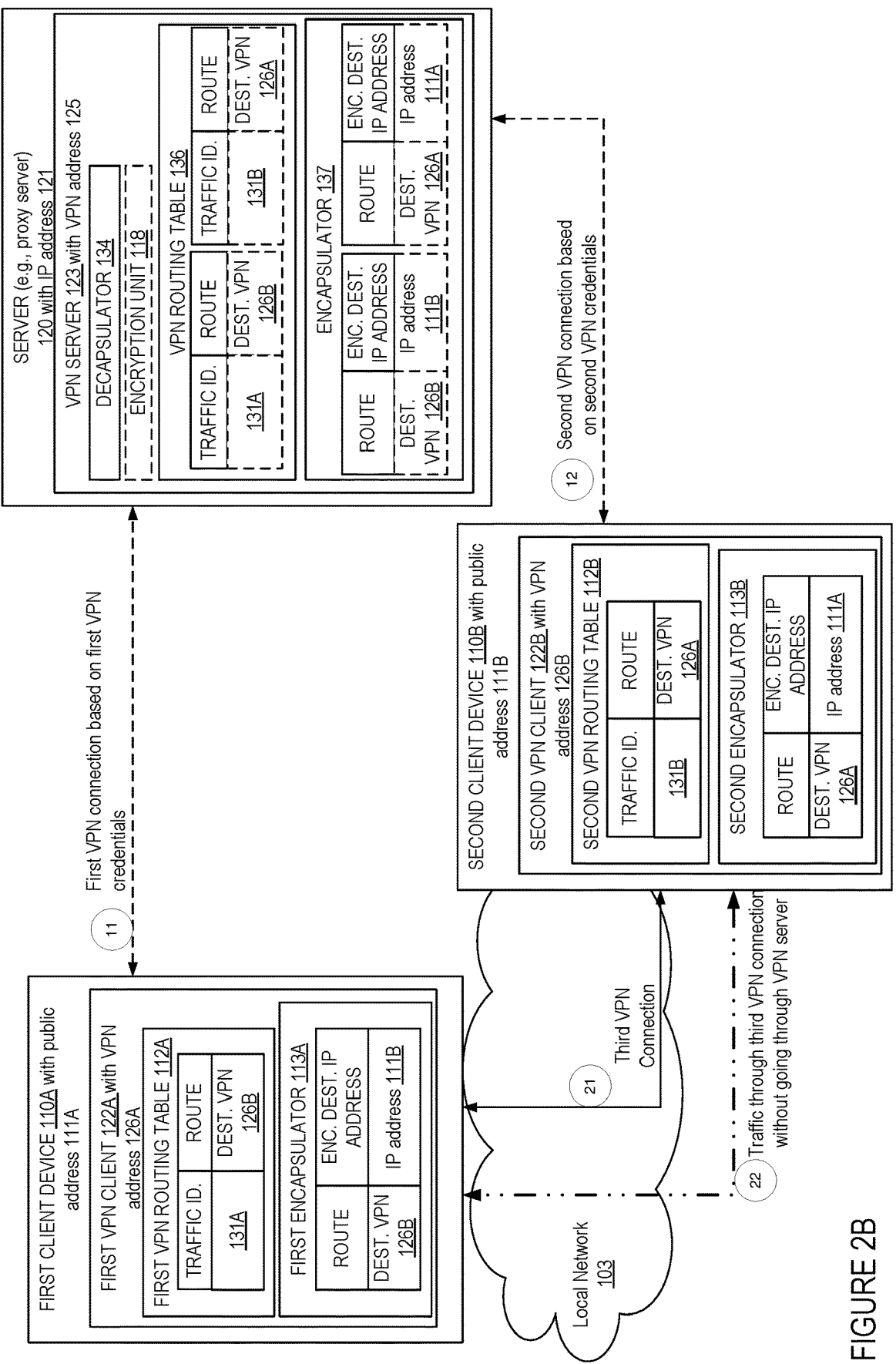
FIG. 2B illustrates a block diagram of detailed view of an exemplary system in which a client device is to determine an optimal route for VPN traffic, in accordance with some embodiments.

The transmission of the first public network address and the second public network address causes the first client device 110A (and/or the second client device 110B) to determine an optimal route from the first client device 110A to the second client device 110B for the traffic in the VPN. FIG. 2B illustrates a block diagram of detailed view of an exemplary system in which a client device is to determine an optimal route for VPN traffic, in accordance with some embodiments.

Upon receipt of the public network address (IP address 111B) of the second client device 110B, the first client device 110A determines an optimal route from the first client device to the second client device for the traffic in the VPN. In some embodiments, the determination of the optimal route is performed based on routing metrics received from the server 120 related to each one of the first VPN connection between the first client device 110A and the server 120, and the second VPN connection between the second client device 110B and the server 120. Additionally, the determination of the optimal route can further be performed based on metrics measured by the client device in the local network 103. For example, the first client device 110A may determine one or more routing metric for routes within the local network 103 for reaching the second client device 110B. Based on these two types of metrics (metrics received from the server 120 and metrics determined by the client device in the local network 103), the first client device 110A determines the optimal VPN route for forwarding VPN traffic from the first client device 110A and the second client device 110B.

In one embodiment, the client devices may determine that the optimal route remains the route through the server 120 and no additional VPN connection is established. In an alternative embodiment, the first client device 110A determines that the optimal route for VPN traffic is a direct connection in the local network 103. Following this determination, the first client device 110A and the second client device 110B may establish a third VPN connection (operation 21) to transmit the traffic 22 directly within the local network 103 without going through the server 120. In this embodiment, the first encapsulator 113A is updated such that the route with VPN destination address 126B is encapsulated based on the public IP address 111B of the second client device 110B instead of being encapsulated based on the public IP address 121 of the server 120. The traffic 22 transmitted from the first client device 110A to the second client device 110B through the third VPN connection is encapsulated within IP packets with destination IP address 111B. The second encapsulator 113B is updated such that the route with VPN destination address 126A is encapsulated based on public IP address 111A of the first client device 110A instead of being encapsulated based on the public IP address 121 of the server 120. The traffic 22 transmitted from the second client device 110B to the first client device 110A through the third VPN connection is encapsulated within IP packets with destination IP address 111A instead of being encapsulated based on the IP address 121 of the server 120.

The third VPN connection is established based on the cryptographic credentials associated with the first client device 110A and the second client device 110B. The cryptographic credentials associated with the first client device 110A and the second client device 110B enable a secure communication through a VPN protocol between the first client device 110A and the second client device 110B. In some embodiments, the cryptographic credentials include cryptographic keys of the first client device 110A and the second client device 110B that are exchanged during the establishment of the third VPN connection.

The embodiments of the present invention offer several advantages when compared with previous VPN services. The embodiments described herein can be used by users that need to securely communicate through a VPN without the burden of operating a VPN server. The embodiments of the present invention allow users to benefit from the advantages of a VPN while avoiding unnecessary communication with a VPN server for traffic that can be forwarded between locally-connected network devices. The embodiments described herein further enable users to avoid the implementations of difficult/unreliable split-tunneling mechanisms. The embodiments of the present invention further ensure that local traffic remains encrypted between the network devices.

The operations in the flow diagrams will be described with reference to the exemplary embodiments of the FIGS. 1 and 2A-B. However, it should be understood that the operations of the flow diagram can be performed by embodiments of the invention other than those discussed with reference to the FIGS. 1 and 2A-B, and the embodiments of the invention discussed with reference to FIGS. 1 and 2A-B can perform operations different than those discussed with reference to the flow diagram.

Figure 3:
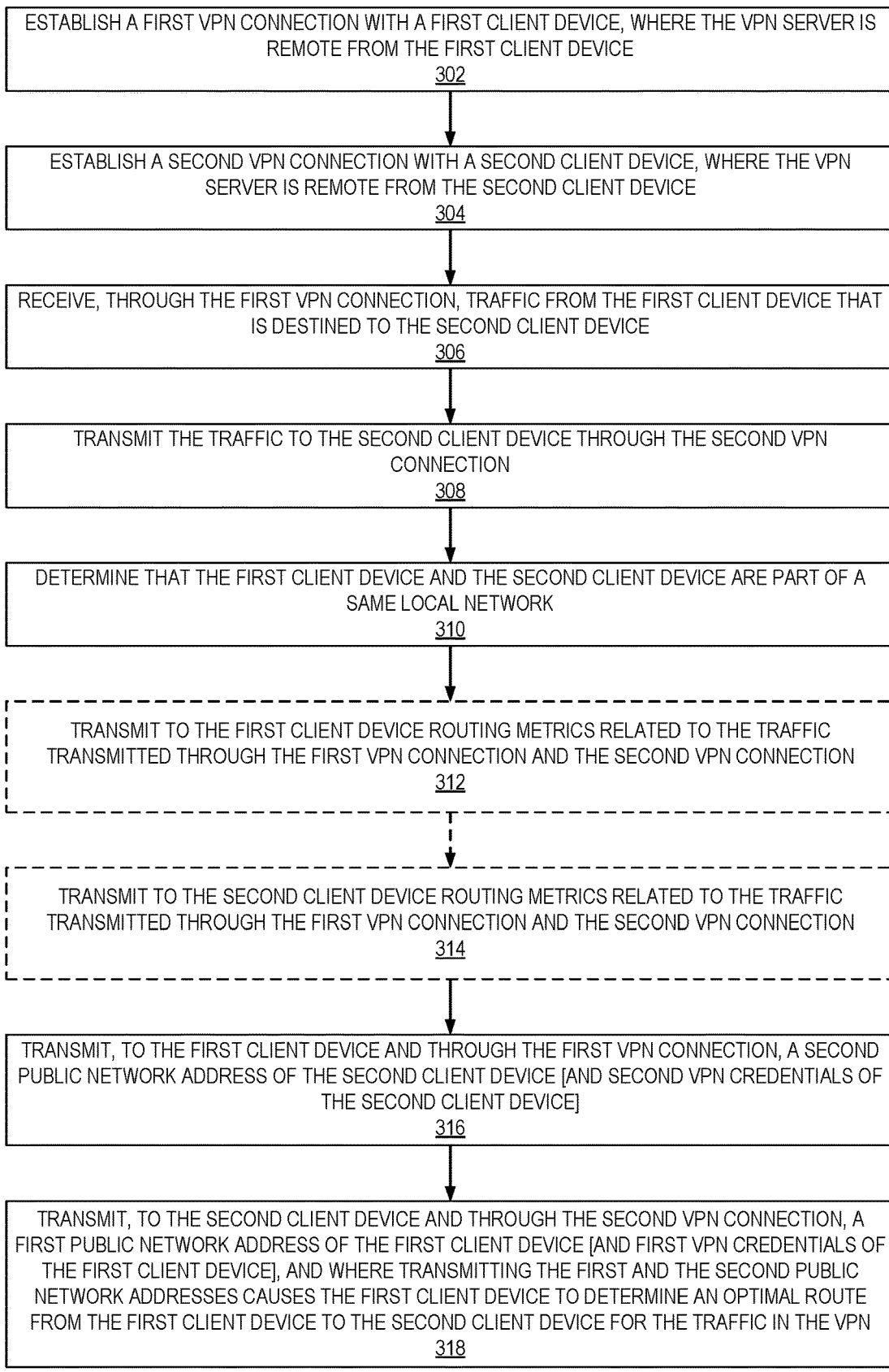
FIG. 3 illustrates a flow diagram of exemplary operations for enabling automatic route optimization in private virtual networks, in accordance with some embodiments.

FIG. 3 illustrates a flow diagram of exemplary operations for enabling automatic route optimization in private virtual networks, in accordance with some embodiments. At operation 302, the server 120 establishes a first VPN connection with a first client device 110A. The server 120 is remote from the first client device 110A. At operation 304, the server 120 establishes a second VPN connection with a second client device 110B. The server 120 is remote from the second client device 110B. At operation 306, the server 120 receives, through the first VPN connection, traffic from the first client device 110A that is destined to the second client device 110B. The server 120 transmits, at operation 308, the traffic to the second client device through the second VPN connection.

The flow then moves to operation 310, at which the server 120 determines that the first client device 110A and the second client device 110B are part of a same local network. In some embodiments, the operations further include operations 312 and operation 314. Operations 312 and 314 are optional operations and can be skipped in some other embodiments. At operation 312, the server 120 transmits to the first client device 110A routing metrics related to the traffic transmitted through the first VPN connection and the second VPN connection. For example, the server 120 may transmit to the first client device 110A routing metrics measured for the first VPN connection that is used for transmitting VPN traffic between the server 120 and the first client device 110A and routing metrics measured for the second VPN connection, where the second VPN connection is used for transmitting VPN traffic between the server 120 and the second client device 110B. At operation 314, the server 120 transmits to the second client device 110B routing metrics related to the traffic transmitted through the first VPN connection and the second VPN connection. For example, the server 120 may transmit to the second client device 110B routing metrics measured for the first VPN connection that is used for transmitting VPN traffic between the server 120 and the first client device 110A and routing metrics measured for the second VPN connection, where the second VPN connection is used for transmitting VPN traffic between the server 120 and the second client device 110B. In some embodiments, the routing metrics can be transmitted to a single one of the two client devices 110A-B such that only one of the operations 312 and 314 is performed. Alternatively, the routing metrics are transmitted to both client devices and the operations 312 and 314 are not performed. In a third embodiment, these two operations are not performed. The routing metrics include for each one of the first VPN connection and the second VPN connection one or more of a measure of link utilization, an indication of a number of hops, a measure of speed, a measure of packet loss, a measure of latency, a measure of path reliability, a measure of path bandwidth, and a measure of throughput.

Responsive to determining that the first client device 110A and the second client device 110B are part of the same local network, the server 120 performs operations 316 and 318. In some embodiments, operations 312 and 314 are also performed as discussed above. At operation 316, the server 120 transmits, to the first client device 110A and through the first VPN connection, a second public network address (e.g., IP address 111B) of the second client device 110B. In some embodiments, the server 120 further transmits the VPN credentials of the second client device 110B to the first client device 110A. In other embodiments, the server 120 does not transmit the VPN credentials of the second client device 110B and these credentials can be obtained by the first client device 110A at a later stage during establishment of a third VPN connection between the first client device 110A and the second client device 110B.

At operation 318, the server 120 transmits, to the second client device 110B and through the second VPN connection, a second public network address (e.g., IP address 111B) of the second client device 110B. In some embodiments, the server 120 further transmits the VPN credentials of the first client device 110A to the second client device 110B. In other embodiments, the server 120 does not transmit the VPN credentials of the first client device 110A and these credentials can be obtained by the second client device 110B at a later stage during establishment of a third VPN connection between the first client device 110A and the second client device 110B.

The transmission of the first public network address and the second public network address causes the first client device 110A to determine an optimal route from the first client device to the second client device for the traffic in the VPN. While the operations of the flow diagram of FIG. 3 are discussed with the transmission of the public network addresses causing the first client device 110A to determine an optimal route, in some embodiments, the transmission of the public network addresses causes the second client device 110B to determine the optimal route. In other embodiments, both the first and the second client device are caused to determine the optimal route. In some embodiments, the determination of the optimal route causes the first client device and the second client device to establish a third VPN connection through a local route in the local network 103 that avoids the server 120. Further, the first VPN credentials and the second VPN credentials allow for communication through the third VPN connection to be cryptographically secured based on the first cryptographic credentials and the second cryptographic credentials.

Figure 4A:
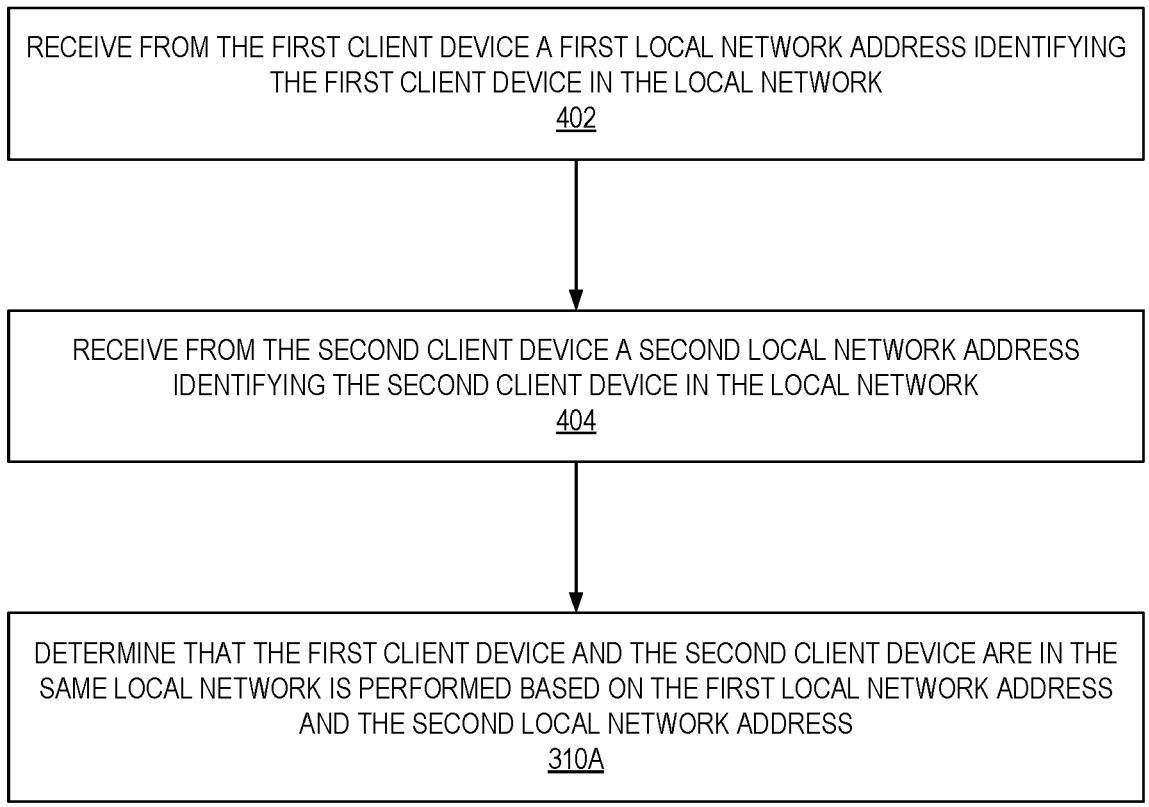
FIG. 4A illustrates a flow diagram of exemplary operations for determining that two client devices are in the same local network, in accordance with one embodiment.

FIG. 4A illustrates a flow diagram of exemplary operations for determining that two client devices are in the same local network, in accordance with one embodiment. In some embodiments, the determination that the two client devices are in the same local network can be performed based on local addresses of each one of the first client device and the second client device. At operation 402, the server 120 receives from the first client device a first local network address identifying the first client device 110A in the local network 103. The server 120 further receives, at operation 404, from the second client device 110B, a second local network address identifying the second client device 110B in the local network 103. At operation 310A, the determining that the first client device and the second client devices are part of the same local network 103 is performed based on the first local network address and the second local network address.

Figure 4B:
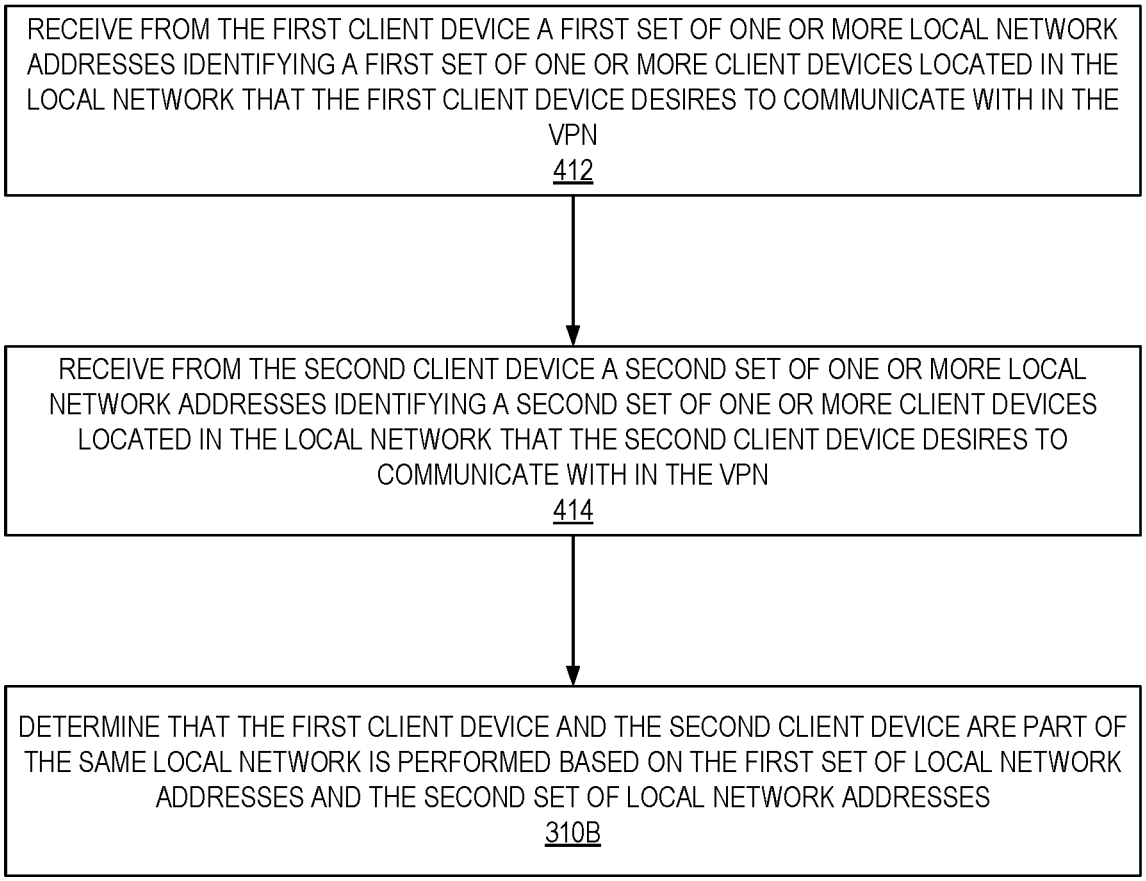
FIG. 4B illustrates a flow diagram of exemplary operations for determining that two client devices are in the same local network, in accordance with one embodiment.

In another embodiments, the determination that two client devices are in the same local network is performed based on local addresses of peer client devices received from each one of the client device. FIG. 4B illustrates a flow diagram of exemplary operations for determining that two client devices are in the same local network, in accordance with one embodiment. At operation 412, the server 120 receives from the first client device 110A a first set of local network addresses respectively identifying a first set of client devices located in the local network that the first client device desires to communicate with in the VPN. The set of local network addresses includes one or more addresses and includes at least the local network address of the second client device 110B.

At operation 414, the server 120 receives from the second client device 110B a second set of local network addresses respectively identifying a second set of client devices located in the local network 103 that the second client device desires to communicate with in the VPN. The second set of local network addresses includes one or more addresses and includes at least the local network address of the first client device 110A.

At operation 310B, the determining that the first client device and the second client device are part of the same local network is performed based on the first set of local network addresses and the second set of local network addresses. For example, the server 120 may determine if the set of local addresses and the second set of local addresses are part of a same local network.

In some embodiments, a combination of operations from the operations of FIGS. 4A and 4B can be performed. For example, operations 402, 404 and operations 412 and 414 can be performed such that the server 120 may receive the local network addresses of each one of the first client device and the second client device as well as local addresses of peers of each one of the first client device and the second client device. In these embodiments, the determination that the first client device and the second client device are part of the same local network can be performed based on all of the local network addresses received. For example, the server 120 may determine that the local network address of the first client device 110A is present in the second set of local network addresses received from the second client device 110B and may determiner that the local network address of the second client device 110B is present in the first set of local network addresses received from the first client device 110A.

Figure 5:
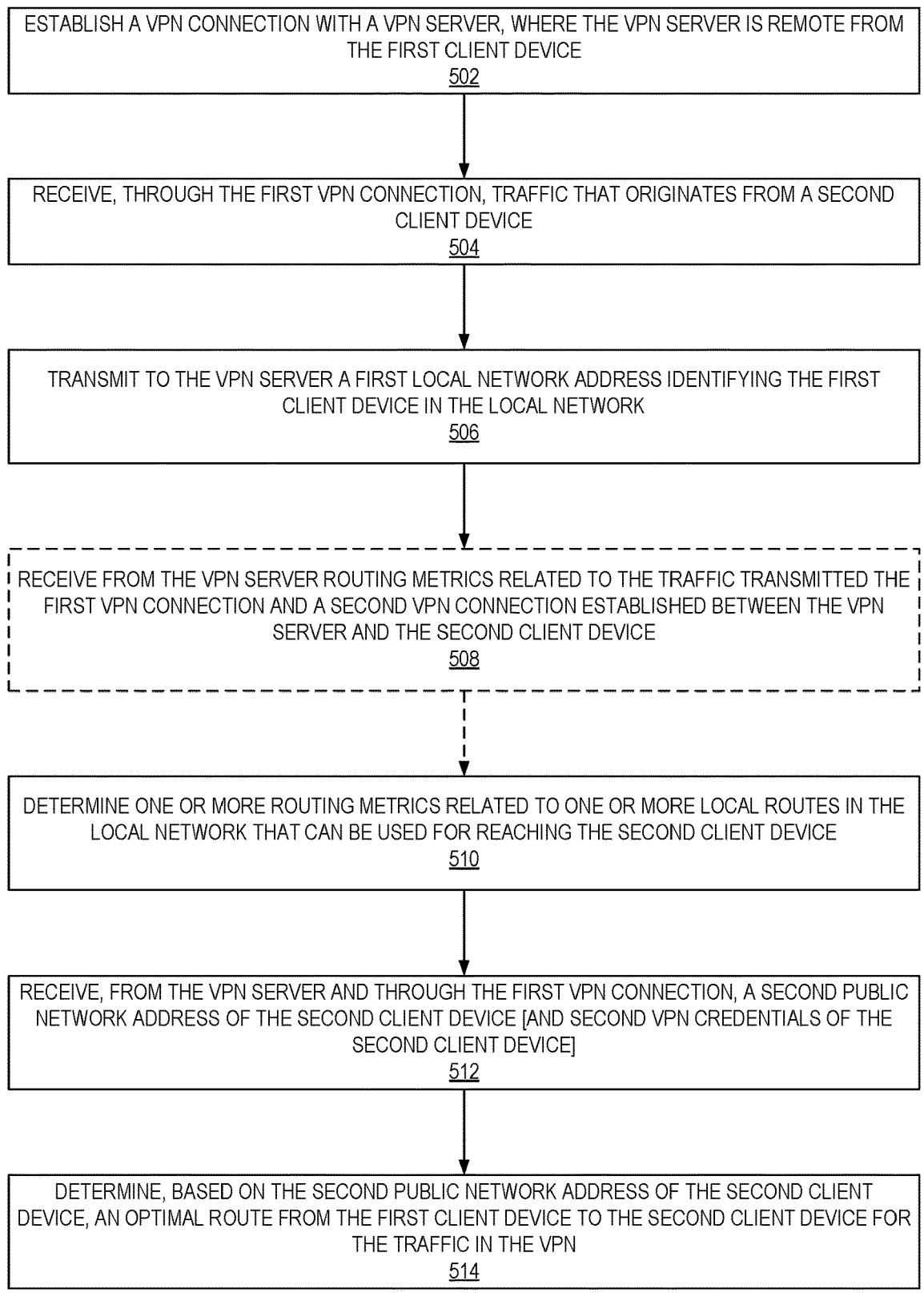
FIG. 5 illustrates a flow diagram of exemplary operations performed in a client device for enabling automatic route optimization in private virtual networks, in accordance with some embodiments.

FIG. 5 illustrates a flow diagram of exemplary operations performed in a client device for enabling automatic route optimization in private virtual networks, in accordance with some embodiments. While the following embodiments will be described with reference to client device 110A, one of ordinary skill in the art would understand that the same operations can be performed by client device 110B or any other client device that is operative to establish a VPN connection with the server 120. At operation 502, the client device (e.g., client device 110A) establishes a VPN connection with a VPN server, where the VPN server is remote from the first client device. At operation 504, the client device receives, through the first VPN connection, traffic that originates from a second client device (e.g., 110B). At operation 506, the first client device 110A transmits to the server 120 a first local network address identifying the first client device in the local network. The flow then moves to operation 508, at which the first client device 110A receives from the VPN server routing metrics related to the traffic transmitted between the first client device and the second client device through the first VPN connection and a second VPN connection established between the VPN server and the second client device. The routing metrics received from the server 120 provides insight on the VPN connection between the server and the first client device 110A and on the VPN connection between the server 120 and the second client device 110B. In some embodiments, this operation is optional and the first client device 110A does not receive routing metrics from the server 120. In these embodiments, the flow of operations moves from operation 506 to operation 510.

At operation 510, the first client device 110A determines routing metrics related to one or more local routes in the local network that can be used for reaching the second client device. A routing metric can be determined based on information like path length, bandwidth, load, hop count, path cost, delay, maximum transmission unit (MTU), reliability and communications cost.

The flow of operations then moves from operation 510 to operation 512. At operation 512, the first client device 110A receives, from the server 120 and through the first VPN connection, a second public network address of the second client device. In some embodiments, in addition to the public network address of the second client device, the first client device 110A further receives second VPN credentials of the second client device. In other embodiments, the first client device 110A does not receive the second VPN credentials and these credentials are obtained during the establishment of a VPN connection between the first client device 110A and the second client device 110B in the local network at a later stage.

At operation 514, the first client device 110A determines, based on the second public network address of the second client device, an optimal route from the first client device to the second client device for the traffic in the VPN.

In some embodiments, the determination of the optimal route can be performed as described with reference to FIG. 6. FIG. 6 illustrates a flow diagram of exemplary operations performed in a client device for optimal VPN route determination, in accordance with some embodiments. At operation 602, the first client device 110A determines based on the routing metrics (determined by the first client device 110A and/or received from the server 120) that there is a route in the local network that can be used for establishing a third VPN connection for transmitting traffic between the first client device and the second client device 110B where the route avoids the server 120.

Upon determining that a route exists in the local network 103 and that this route represents an optimal path for the VPN traffic between the first client device 110A and the second client device 110B, the flow moves to operation 604, at which the first client device 110A establishes a third VPN connection between the first client device 110A and the second client device 110B. The establishment of the third VPN connection includes the configuration of the encapsulation tables in the first client device with entries that cause the encapsulation of VPN traffic destined to the VPN destination address of the second client device with the public network address of the second client device as opposed to the network address of the VPN server. The establishment of the third VPN connection further includes the configuration of the encapsulation tables in the second client device with entries causing the encapsulation of VPN traffic destined to the VPN destination address of the first client device with the public network address of the first client device as opposed to the network address of the VPN server. The third VPN connection is established based on the VPN credentials of the first client device 110A and the VPN credentials of the second client device 110B. In some embodiments, operation 604 includes operations 605A and 605B. At operation 605A, the first client device 110A obtains the second VPN credentials of the second client device from the second client device 110B. At operation 605B, the first client device 110A transmits the first VPN credentials to the second client device 110B. In some embodiments, the operations 605A and 605B are not performed as the VPN credentials are received from the server 120 along with the public network address of the second client device.

The flow of operations moves to operation 606, at which the first client device 110A transmits the VPN traffic to the second client device through the third VPN connection and operation 608, at which the first client device 110A receives VPN traffic from the second client device through the third VPN connection.

The embodiments of the present invention can be used by users that need to securely communicate through a VPN without the burden of operating a VPN server. The embodiments of the present invention allow users to benefit from the advantages of a VPN while avoiding unnecessary communication with a VPN server for traffic that can be forwarded between locally-connected network devices. The embodiments described herein further enable users to avoid the implementations of difficult/unreliable split-tunneling mechanisms. The embodiments of the present invention further ensure that local traffic remains encrypted between the network devices.

Figure 7:
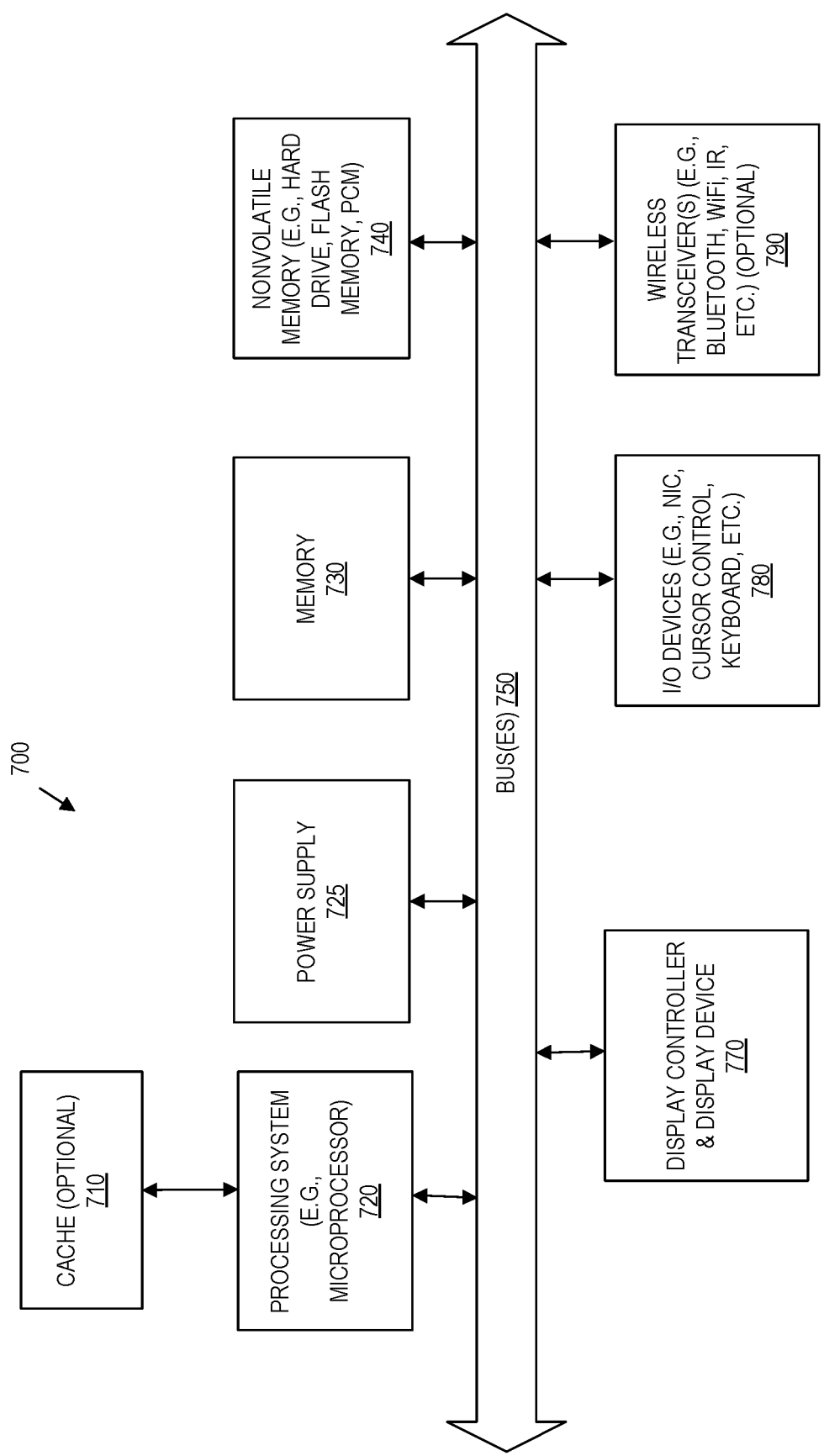
FIG. 7 illustrates a block diagram of an exemplary computer system that can be used for enabling route optimization in private virtual networks, in accordance with some embodiments.

FIG. 7 illustrates a block diagram of an exemplary computer system that can be used for enabling route optimization in private virtual networks, in accordance with some embodiments. The computer system 700, which is an electronic device, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740 and execute the instructions to perform operations described herein. The bus 750 interconnects the above components together and also interconnects those components to the display controller & display device 770, Input/Output devices 780 (e.g., NIC (Network Interface Card), a cursor control (e.g., mouse, touchscreen, touchpad, etc.), a keyboard, etc.), and the optional wireless transceiver(s) 790 (e.g., Bluetooth, Wi-Fi, Infrared, etc.). In one embodiment, the first client device 110A, the second client device 110B, and/or the server 120A can take the form of the computer system 700 and perform the operations described with reference to FIGS. 1-6.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a client device, comprising:
   establishing a first virtual private network (VPN) connection with a VPN server, wherein the VPN server is remote from the client device;

transmitting to the VPN server, through the first VPN connection, traffic from the client device that is destined to a different client device that has a second VPN connection with the VPN server;

receiving, from the VPN server over the first VPN connection, a public network address of the different client device;

receiving, from the VPN server, routing metrics related to traffic transmitted through the first VPN connection and the second VPN connection;

determining, based at least in part on the routing metrics, an optimal route from the client device to the different client device, wherein the optimal route is a connection between the client device and the different client device that does not traverse the VPN server;

establishing a third VPN connection with the different client device; and transmitting traffic destined for the different client device using the third VPN connection that is encapsulated with packets destined to the public network address of the different client device.

2. The method of claim 1, further comprising:

prior to receiving the public network address of the different client device, transmitting a local network address identifying the client device in a local network to the VPN server, wherein the client device and the different client device are part of a same local network.

3. The method of claim 1, further comprising:

transmitting a local network address identifying the different client device to the VPN server.

4. The method of claim 1, wherein the routing metrics include for each one of the first VPN connection and the second VPN connection one or more of a measure of link utilization, an indication of a number of hops, a measure of speed, a measure of packet loss, a measure of latency, a measure of path reliability, a measure of path bandwidth, and a measure of throughput.

5. The method of claim 1, wherein determining the optimal route from the client device to the different client device further is based on one or more routing metrics for routes within a local network for which the client device and the different client device are a part.

6. The method of claim 1, wherein establishing the third VPN connection with the different client device is based on cryptographic credentials associated with the client device and the different client device.

7. The method of claim 1, wherein the client device and the different client device are part of a same local network.

8. A client device, comprising:

one or more processors; and a non-transitory computer readable storage medium that stores code, which when executed by the one or more processors causes the client device to perform operations including:

establishing a first virtual private network (VPN) connection with a VPN server, wherein the VPN server is remote from the client device;

transmitting to the VPN server, through the first VPN connection, traffic from the client device that is destined to a different client device that has a second VPN connection with the VPN server;

receiving, from the VPN server over the first VPN connection, a public network address of the different client device;

receiving, from the VPN server, routing metrics related to traffic transmitted through the first VPN connection and the second VPN connection;

determining, based at least in part on the routing metrics, an optimal route from the client device to the different client device, wherein the optimal route is a connection between the client device and the different client device that does not traverse the VPN server;

establishing a third VPN connection with the different client device; and transmitting traffic destined for the different client device using the third VPN connection that is encapsulated with packets destined to the public network address of the different client device.

9. The client device of claim 8, wherein the operations further comprise:

prior to receiving the public network address of the different client device, transmitting a local network address identifying the client device in a local network to the VPN server, wherein the client device and the different client device are part of a same local network.

10. The client device of claim 8, wherein the operations further comprise:

transmitting a local network address identifying the different client device to the VPN server.

11. The client device of claim 8, wherein the routing metrics include for each one of the first VPN connection and the second VPN connection one or more of a measure of link utilization, an indication of a number of hops, a measure of speed, a measure of packet loss, a measure of latency, a measure of path reliability, a measure of path bandwidth, and a measure of throughput.

12. The client device of claim 8, wherein determining the optimal route from the client device to the different client device further is based on one or more routing metrics for routes within a local network for which the client device and the different client device are a part.

13. The client device of claim 8, wherein establishing the third VPN connection with the different client device is based on cryptographic credentials associated with the client device and the different client device.

14. The client device of claim 8, wherein the client device and the different client device are part of a same local network.

15. A non-transitory computer readable storage medium that stores instructions which when executed by one or more processors of a client device cause said processors to perform operations including:

establishing a first virtual private network (VPN) connection with a VPN server, wherein the VPN server is remote from the client device;

transmitting to the VPN server, through the first VPN connection, traffic from the client device that is destined to a different client device that has a second VPN connection with the VPN server;

receiving, from the VPN server over the first VPN connection, a public network address of the different client device;

receiving, from the VPN server, routing metrics related to traffic transmitted through the first VPN connection and the second VPN connection;

determining, based at least in part on the routing metrics, an optimal route from the client device to the different client device, wherein the optimal route is a connection between the client device and the different client device that does not traverse the VPN server;

establishing a third VPN connection with the different client device; and transmitting traffic destined for the different client device using the third VPN connection that is encapsulated with packets destined to the public network address of the different client device.

16. The non-transitory computer readable storage medium of claim 15, wherein the operations further comprise:
prior to receiving the public network address of the different client device, transmitting a local network address identifying the client device in a local network to the VPN server, wherein the client device and the different client device are part of a same local network.

17. The non-transitory computer readable storage medium of claim 15, wherein the operations further comprise:
transmitting a local network address identifying the different client device to the VPN server.

18. The non-transitory computer readable storage medium of claim 15, wherein the routing metrics include for each one of the first VPN connection and the second VPN connection one or more of a measure of link utilization, an indication of a number of hops, a measure of speed, a measure of packet loss, a measure of latency, a measure of path reliability, a measure of path bandwidth, and a measure of throughput.

19. The non-transitory computer readable storage medium of claim 15, wherein determining the optimal route from the client device to the different client device further is based on one or more routing metrics for routes within a local network for which the client device and the different client device are a part.

20. The non-transitory computer readable storage medium of claim 15, wherein establishing the third VPN connection with the different client device is based on cryptographic credentials associated with the client device and the different client device.

21. The non-transitory computer readable storage medium of claim 15, wherein the client device and the different client device are part of a same local network.

\* \* \* \* \*